ISO-8859-1
United States Patent [19]

Burba, III

[11] Patent Number: 4,540,509

[45] Date of Patent: * Sep. 10, 1985

[54] CRYSTALLINE 3-LAYER LITHIUM ALUMINATES

[75] Inventor: John L. Burba, III, Angleton, Tex.

[73] Assignee: The Dow Chemical Company, Midland, Mich.

[*] Notice: The portion of the term of this patent subsequent to Sep. 7, 1999 has been disclaimed.

[21] Appl. No.: 412,612

[22] Filed: Aug. 30, 1982

Related U.S. Application Data

[63] Continuation-in-part of Ser. No. 217,614, Dec. 18, 1980, Pat. No. 4,348,295.

[51] Int. Cl.$^3$ .................... C01D 15/04; B01D 15/04; C09K 3/00
[52] U.S. Cl. .................. 252/184; 423/179.5; 502/231; 502/11; 502/344; 502/355; 502/402; 502/414; 502/514; 502/527; 521/28
[58] Field of Search .................. 252/184; 423/179.5, 423/181; 521/28; 502/12, 402, 414, 514, 527, 231, 344, 355

[56] References Cited

U.S. PATENT DOCUMENTS

| | | | |
|---|---|---|---|
| 4,116,856 | 9/1978 | Lee et al. | 252/184 |
| 4,116,857 | 9/1978 | Lee et al. | 252/184 |
| 4,116,858 | 9/1978 | Lee et al. | 252/184 |
| 4,159,311 | 6/1979 | Lee et al. | 423/179.5 |
| 4,221,767 | 9/1980 | Lee et al. | 423/179.5 |
| 4,291,001 | 9/1981 | Repsher et al. | 423/179.5 |
| 4,347,327 | 8/1982 | Lee et al. | 521/28 |
| 4,348,295 | 9/1982 | Burba | 252/184 |
| 4,348,296 | 9/1982 | Bauman et al. | 252/184 |
| 4,348,297 | 9/1982 | Bauman et al. | 252/184 |
| 4,376,100 | 3/1983 | Lee et al. | 423/179.5 |

*Primary Examiner*—Edward A. Miller
*Assistant Examiner*—Virginia B. Caress
*Attorney, Agent, or Firm*—Walter J. Lee

[57] ABSTRACT

Ion exchange resins in the base form, e.g., DOWEX MWA—1—OH ion exchange resin, which contain crystalline $Al(OH)_3$, e.g., gibbsite, and/or bayerite, and/or norstrandite, are treated with hot, concentrated LiX solutions (where X is anion) to prepare 3-layer crystalline $LiX \cdot 2Al(OH)_3 \cdot nH_2O$ in the resin.

12 Claims, No Drawings

CRYSTALLINE 3-LAYER LITHIUM ALUMINATES

CROSS-REFERENCE TO RELATED APPLICATIONS

This is a continuation-in-part application of copending application Ser. No. 217,614, filed Dec. 18, 1980, (now U.S. Pat. No. 4,348,295) which teaches preparations of 2-layer and 3-layer lithium aluminates, with and without substrates such as ion exchange resins. Another copending application, Ser. No. 217,611 filed Dec. 18, 1980 (now U.S. Pat. No. 4,348,296), also discloses preparation of 2-layer and 3-layer lithium aluminates on various substrates.

BACKGROUND OF THE INVENTION

U.S. Pat. No. 4,116,858 and U.S. Pat. No. 4,159,311, disclose that an ion exchange resin may be saturated with aqueous $AlCl_3$ solution and that reaction with $NH_4OH$ converts the $AlCl_3$ in situ to $Al(OH)_3$. This so-formed amorphous $Al(OH)_3$ is then reacted with LiX, where X is halide, at elevated temperature to form crystalline $LiX.2Al(OH)_3$ which is useful in selectively recovering $Li^+$ values from aqueous solutions, e.g., Li-containing brines.

U.S. Pat. No. 4,116,858 and U.S. Pat. No. 4,221,767 disclose that improvements in the above discussed formation of crystalline $LiX.2Al(OH)_3$ are found by reacting amorphous $Al(OH)_3$, or crystalline hydrous alumina (e.g., norstrandite, bayerite, gibbsite or mixtures of these) with LiOH to form $LiOH.2Al(OH)_3 nH_2O$ which is then reacted with LiX to form the crystalline $LiX.2Al(OH)_3$, where X is halide.

Various forms of alumina, $Al_2O_3$, are known, some of which occur as natural minerals, some of which are hydrated, and some of which are crystalline. The Handbook of Chemistry shows the following:

| Name | Crystalline Form | M.P. °C. |
| --- | --- | --- |
| aluminum oxide, $Al_2O_3$ | hex. col. | 2050 |
| $\alpha$-$Al_2O_3$, corundum | trig;col.cr,n | 2015 |
| $\gamma$-$Al_2O_3$, $\gamma$-alumina | wh.micro.cr.,n | tr.to alpha |
| $Al_2O_3.3 H_2O$, gibbsite, (hydrargillite) | monocl.,wh.cr. | tr.to $Al_2O_3.H_2O$ (Boehmite) |
| $Al_2O_3.3 H_2O$, bayerite | wh.micro.cr. | tr.to $Al_2O_3.H_2O$ (Boehmite) |
| aluminum oxide, $Al_2O_3.xH_2O$ | amor.wh.pwd. | —$xH_2O$, tr. to $\gamma$-$Al_2O_3$ |

Norstrandite is a crystalline hydrous alumina, as are gibbsite and bayerite.

The present disclosure is believed to be most closely related to the above-identified patents and the patents are incorporated by reference in their entirety here. The teachings in U.S. Pat. No. 4,116,856 are particularly relevant where it discloses that crystalline hydrous alumina (e.g., norstrandite and/or bayerite) dispersed in ion exchange resin is not converted back to its original $LiX.2Al(OH)_3.nH_2O$ form by treatment with LiX unless the hydrous alumina is first, or simultaneously, reacted with LiOH. I have found, however, that crystalline hydrous aluminas can be reacted directly with lithium salts to form crystalline lithium salt aluminates if the correct ranges of temperature and concentration are employed. I have also found that 2-layer lithium aluminate can be regenerated, without conversion to gibbsite, by employing an aqueous wash containing at least about 800 ppm. $Li^+$.

SUMMARY OF THE INVENTION

Ion exchange resins in the base form which contain incorporated amounts of crystalline $Al(OH)_3$ of the bayerite or norstrandite variety are treated (reacted) with hot, concentrated LiX aqueous solutions to prepare 3-layer crystalline $LiX.2Al(OH)_3.nH_2O$ (where X is anion) without solubilizing the $Al(OH)_3$.

DESCRIPTION OF THE INVENTION

Crystalline hydrous aluminas are reacted with lithium salts under the influence of elevated temperature and sufficient concentration to form lithium aluminates, designated here as $LiX.2Al(OH)_3.nH_2O$ where X is an anion characterized as an anion which will form acids when in molecular combination with hydrogen or will form salts when in molecular combination with metal ions. It will be understood, of course, that the lithium aluminates will normally contain some waters of hydration, designated as $nH_2O$ in the above formula. The anion may have a valence of 1, 2, or 3.

When the beginning hydrous alumina is amorphous, such as when freshly prepared by ammonia precipitation of $Al(OH)_3$ from an $AlCl_3$ solution, the reaction to form lithium aluminates may be done using relatively weak solutions of the lithium salt (up to about 10%) and at relatively low temperatures (e.g., 20° C.–40° C.), then when heated at, e.g., about 50° C. or higher, the lithium aluminate becomes crystallized as a 3-layer crystal.

In accordance with generally accepted practice, all solution concentrations in this disclosure are percent by weight, unless noted otherwise.

However, when the beginning hydrous alumina is crystalline (such as bayerite, gibbsite, norstrandite, or boehmite), then the relatively low temperature treatment with lithium salt does not appear to form an appreciable amount (if any) of lithium aluminate within a reasonable length of time.

It has now been found, surprisingly, that when heated at elevated temperature of preferably about 85° C.–120° C., the mixture of crystalline hydrous alumina and lithium salt forms lithium aluminate. Along with this higher temperature, it is necessary that the lithium salt solution be of a relatively high concentration, preferably above about 12%, most preferably above about 20% or may be at the saturation limit of the lithium salt, especially if it is only slightly soluble. The combination of high temperature and high concentration is particularly effective in forcing the lithium salt into the layers of the hydrous alumina crystals, which in some cases gives a crystallographic unit cell having two layers of lithium salt and two layers of hydrous alumina and in other cases gives a crystallographic unit cell having three layers of lithium salt and three layers of hydrous alumina.

As used herein, the expressions "2-layer" and "3-layer" refer to the number of layers bounded on both sides by the aluminate layers into which the subject Li compounds are intercalated. It will be realized, of course, that the crystals of lithium aluminates are normally present as aggregates or stacks of a plurality of unit cells rather than each unit cell standing as a separate physical entity.

The lithium aluminates discussed here have two crystal structures, viz those of 2-layer crystallographic unit cells and those of 3-layer crystallographic unit cells. The 3-layer lithium aluminates have a 3-fold screw axis oriented parallel to the c-axis of the lithium aluminate crystal. The 2-layer lithium aluminates have a 2-fold axis of rotation oriented parallel to the c-axis, as determined by the x-ray crystal studies.

For purposes of discussion and description in this disclosure, 2-layer lithium aluminates and 3-layer lithium aluminates are graphically illustrated as follows:

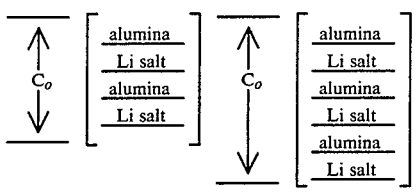

The heating of the mixture of aqueous solution of lithium salt and hydrous alumina crystals may be performed in an open vessel, in a closed vessel, or at reflux. If performed in an open vessel where water vapor can escape, or if reduced pressure is applied to remove water vapor, the resulting increase in concentration of the lithium salt is beneficial in that the higher concentration tends to help drive the lithium salt into the alumina layers.

In those instances wherein water vapor is allowed to escape, a low concentration (generally less than about 10%) lithium salt may be employed at the outset, then the increase in concentration which results from water loss can be sufficient to drive the lithium salt into the hydrous alumina.

The preferred lower ratio of lithium salt to hydrous alumina, $Al(OH)_3$, in the mixture is about 0.5 moles of Li to 1 mole of Al. The upper limit of Li to Al is the saturation point of the lithium salt solution.

The lithium salts for reaction with the hydrous alumina can be at least one of the group exemplified by $LiCl$, $LiBr$, $LiI$, $LiNO_3$, $LiClO_4$, $LiClO$, $LiSCN$, $LiOOCH$, $LiC_2H_3O_2$, and the like. Stated another way the X in LiX may be any anion of a halo acid (excluding F), a mineral acid or inorganic acid, or an organic acid which is stable under reaction conditions. Virtually any water soluble lithium salt would be expected to be within the purview of this invention so long as the anion is not so large as to preclude entering the interstices of the alumina crystal.

The 2-layer variety of lithium aluminate is a novel composition and is prepared by reaction of lithium salt with gibbsite. Reaction of lithium salt with other forms of hydrous alumina, such as bayerite or norstrandite, produces 3-layer lithium aluminates. It is not possible to convert 2-layer lithium aluminate to 3-layer lithium aluminate without completely solubilizing the lithium aluminate to re-precipitate it as 3-layer.

The 2-layer $LiCl.2Al(OH)_3.nH_2O$ crystal, whether in neat form or supported on or within a substrate, exhibits different behavior in $H_2O$ than does the 3-layer variety. When reacted with $H_2O$ the 2-layer $LiCl.2Al(OH)_3.nH_2O$ decomposes to LiCl and gibbsite with the equilibrium LiCl concentration of about 0.14 moles of $Li^+$ per liter of solution, whereas the 3-layer $LiCl2Al(OH)_3.nH_2O$ crystal is stable in $H_2O$ if there is as much as about 50 ppm $Li^+$ in the solution.

The 2-layer $LiX.2Al(OH)_3.nH_2O$ can be reacted with LiOH to form 2-layer $LiOH.2Al(OH)_3.nH_2O$; this can then be neutralized with an acid to form 2-layer lithium aluminate containing anions of the acid. Likewise 3-layer $LiOH.2Al(OH)_3.nH_2O$ can be neutralized with an acid to form 3-layer lithium aluminate containing anions of the acid.

The porous substrate into which the crystalline hydrous alumina can be loaded may be an inert material, such as an inorganic or organic material. For certain uses and reasons, the substrate is preferably a macroporous resin such as an ion exchange resin as taught in U.S. Pat. No.4,116,858 and U.S. 4,116,856.

The present disclosure encompasses the regeneration of 2-layer crystalline $LiX.2Al(OH)_3.nH_2O$, where X is halide, preferably chloride, when said 2-layer crystals are contained within an ion exchange resin, thereby forming a composite useful for removing $Li^+$ ions from solution. It has been found that an aqueous leaching used in regenerating the crystal will destroy the 2-layer crystal structure unless the leaching solution contains at least about 800 ppm $Li^+$ ion, preferably at least about 1000 ppm; the temperature of the leaching solution is preferably in the range of about 70° C. to about 100° C. If the $Li^+$ ions are the result of dissolving LiCl in water, then a $Li^+$ ion concentration of about 800 ppm is equivalent to about 4888 ppm of LiCl; a $Li^+$ ion concentration of about 1000 ppm is equivalent to about 6110 ppm of LiCl.

If a leaching solution is used which contains substantially less than about 800 ppm $Li^+$ ion concentration, then the 2-layer crystal structure may be substantially destroyed and when the hydrous alumina is rejuvenated by use of LiCl and/or LiOH along with heating, the crystal reforms as a 3-layer crystal.

In the preparation of composites of lithium aluminates in ion exchange resins it is found that the use of hot, concentrated LiX (where X is halide or other anion) to convert crystalline $Al(OH)_3$ to crystalline $LiX.2Al(OH)_3.nH_2O$ can give somewhat different results, depending on the form of the resin and the crystalline form of the $Al(OH)_3$. In the absence of a substrate, such as an ion exchange resin the treatment with hot, concentrated LiX aqueous solution yields 3-layer crystalline $LiX.2Al(OH)_3.nH_2O$ if the crystalline $Al(OH)_3$ is of the bayerite or norstrandite variety, but the treatment yields 2-layer crystalline $LiX.2Al(OH)_3.nH_2O$ if the crystalline $Al(OH)_3$ is of the gibbsite variety. If the $Al(OH)_3$ is amorphous, then the treatment yields 3-layer crystalline $LiX.2Al(OH)_3.nH_2O$. If the substrate is an inert material, having no ion exchange capability of its own, then the treatment yields the same results as if no substrate is used. If the substrate is an ion exchange resin in its acid form, such as DOWEX MWA-1-Cl ion exchange resin, then the treatment still gives 3-layer crystalline $LiX.2Al(OH)_3.nH_2O$ from bayerite or norstrandite and gives 2-layer crystalline $LiX.2Al(OH)_3. nH_2O$ from gibbsite. If, however, the resin is in its base form, e.g., DOWEX MWA-1-OH ion exchange resin, then bayerite or norstrandite yields 3-layer crystals and gibbsite also yields 3-layer crystals of $LiX.2Al(OH)_3.nH_2O$. It appears that having the resin in its base form causes the crystalline $Al(OH)_3$, even the gibbsite variety, to become solubilized to an extent which causes the resultant treatment with hot concentrated LiX to yield 3-layer crystals of $LiX.2Al(OH)_3.nH_2O$.

The examples which follow are to illustrate particular embodiments; the invention is not limited to the particular embodiments illustrated, but is limited only by the claims.

EXAMPLE 1

A 50-gram portion of gibbsite is mixed and reacted with 200 ml of 20% LiCl aqueous solution at 115° C. for about 2 hours. The product obtained is 2-layer LiCl2Al(OH)$_3$.nH$_2$O as determined by x-ray diffraction data.

EXAMPLE 2

A 200-ml portion of a macroporous ion exchange resin in bead form (DOWEX MWA-1-Cl, a Trademark of The Dow Chemical Company) containing gibbsite within its pores is mixed and reacted with about 500ml of 20% LiCl solution at about 105° C. under reflux for about 2-3 hours. The reaction product obtained is 2-layer LiCl2Al(OH)$_3$.nH$_2$O as determined by x-ray diffraction data.

EXAMPLE 3

A 200-ml portion of the same resin as in Example 2 above, but containing bayerite within its pores, is mixed and reacted with about 500 ml of 20LiCl aqueous solution at about 105° C. under reflux for about 2-3 hours. The reaction product obtained is 3-layer LiCl2Al(OH)$_3$.nH$_2$O as determined by x-ray diffraction data.

EXAMPLE 4

About 200 ml of the same resin as above, but containing norstrandite within its pores, is refluxed with about 500 ml of 20% LiCl aqueous solution for about 2-3 hours. The reaction product obtained is 3-layer LiCl2Al(OH)$_3$.nH$_2$O as determined by x-ray diffraction data.

EXAMPLE 5

A composite of 2-layer lithium aluminate/resin is prepared by mixing and reacting DOWEX MWA-1-Cl ion exchange resin, containing gibbsite in the pores, with a 20% aqueous solution of LiCl at about 105° C. The composite is prepared for use as a Li$^+$ value absorber by substantially "unloading" (i.e., regenerating) Li$^+$ values from the crystal by washing it with a 1000 ppm Li$^+$ solution at 90° C. The so-regenerated composite is useful for extracting Li$^+$ values from a Li$^+$-containing natural brine (Smackover brine) until the 2-layer crystal is again loaded with Li$^+$ values. Regeneration with 1000 ppm Li$^+$ solution at 90° C. creates no gibbsite, indicating the 2-layer crystal remains intact. In contrast thereto, regenerating with water containing no Li$^+$ values, or containing only about 300 ppm Li$^+$ values causes degeneration of the 2-layer crystal to gibbsite, which contaminates the Li-containing effluant, from the wash column.

EXAMPLE 6

This example demonstrates the synthesis of a base form of macroporous ion exchange resin composite containing 3-layer crystalline LiCl2Al(OH)$_3$.nH$_2$O wherein the 3-layer aluminate crystal is derived from crystalline Al(OH)$_3$, instead of amorphous Al(OH)$_3$, using a procedure which does not solubilize the crystalline Al(OH)$_3$.

A 200 ml. portion of DOWEX MWA-1-OH ion exchange resin containing about 3.28 mmoles (per ml. of resin) of Al(OH)$_3$, gibbsite is placed in about 200 ml. of concentrated LiCl aqueous solution (about 5M conc.). The mixture is placed in an 80° C. oven for about 48 hours. The Al(OH)$_3$ is completely converted to 3-layer crystalline LiCl2Al(OH)$_3$.nH$_2$O with no loss of Al(OH)$_3$ into the liquid phase, i.e., no solubilization of the Al(OH)$_3$. Also, there is no apparent breakage of the resin and the solution remains clear.

Compounds made in accordance with the present disclosure are useful in selectively removing Li$^+$ values from aqueous solution and are also useful in exchanging of the anion (X) with other anions in aqueous solution. Of special interest is the removal of Li$^+$ values from natural brines, e.g., Smackover brine, and from ore leachings, e.g., Spodumene ore.

I claim:

1. A process for preparing crystalline 3-layer LiX.2Al(OH)$_3$.nH$_2$O in a macroporous ion exchange resin, said process comprising
   reacting a composite of a macroporous ion exchange resin, which is in its base form and which contains crystalline Al(OH)$_3$ dispersed therein,
   by mixing the said composite with hot, concentrated aqueous solution of LiX, where X is an anion,
   thereby converting the crystalline Al(OH)$_3$ in the resin to crystalline 3-layer LiX.2Al(OH)$_3$.nH$_2$O.

2. The process of claim 1 wherein the crystalline Al(OH)$_3$ is of the gibbsite and/or bayerite and/or norstrandite variety.

3. The process of claim 1 wherein the crystalline Al(OH)$_3$ is of the gibbsite variety.

4. The process of claim 1 wherein the hot LiX aqueous solution is at a temperature of at least about 70° C.

5. The process of claim 1 wherein the hot LiX aqueous solution is at a temperature in the range of about 85° C. to about 120° C.

6. The process of claim 1 wherein the concentration of the LiX in the aqueous solution is at least about 20% of the saturation concentration by weight.

7. The process of claim 1 wherein the LiX in the aqueous solution is LiCl and the concentration of the LiCl solution is at least about 8% by weight.

8. A process for preparing crystalline 3-layer LiCl.2Al(OH)$_3$.nH$_2$O in a macroporous ion exchange resin, said process comprising
   reacting a composite of a macroporous ion exchange resin, which is in its base form and which contains gibbsite dispersed therein, with a hot, concentrated aqueous solution of LiCl by mixing said composite and said solution,
   thereby converting said gibbsite in said resin to crystalline 3-layer LiCl2Al(OH)$_3$.nH$_2$O.

9. The process of claim 8 wherein the LiCl solution is at a temperature of at least about 70° C.

10. The process of claim 8 wherein the LiCl solution is at at temperature in the range of about 85° C. to about 120 ° C.

11. The process of claim 8 wherein the concentration of the LiCl in the aqueous solution is at least about 20% of the saturation concentration by weight.

12. The process of claim 8 wherein the concentration of the LiCl in the aqueous solution is at least about 8% by weight.

* * * * *